(12) United States Patent
Nordin et al.

(10) Patent No.: US 8,217,268 B2
(45) Date of Patent: Jul. 10, 2012

(54) ALIEN CROSSTALK SUPPRESSION WITH ENHANCED PATCH CORD

(75) Inventors: Ronald A Nordin, Naperville, IL (US); David R Hawkins, Sugar Hill, GA (US); Michael V. Doorhy, Mokena, IL (US); Jack D. Tison, Bourbonnais, IL (US); Andrew J. Stroede, Frankfort, IL (US); Masud Bolouri-Saransar, Orland Park, IL (US); Scott R. Hartman, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/788,891

(22) Filed: May 27, 2010

(65) Prior Publication Data

US 2010/0236813 A1    Sep. 23, 2010

Related U.S. Application Data

(63) Continuation of application No. 11/468,848, filed on Aug. 31, 2006, now Pat. No. 7,728,228, which is a continuation of application No. 10/887,718, filed on Jul. 9, 2004, now Pat. No. 7,109,424.

(60) Provisional application No. 60/486,683, filed on Jul. 11, 2003, provisional application No. 60/488,566, filed on Jul. 18, 2003, provisional application No. 60/565,464, filed on Apr. 26, 2004.

(51) Int. Cl.
*H01B 7/00* (2006.01)
(52) U.S. Cl. .................................................. 174/113 R
(58) Field of Classification Search .................. 174/27, 174/113 R
See application file for complete search history.

(56) References Cited

U.S. PATENT DOCUMENTS

| | | | | |
|---|---|---|---|---|
| 6,318,062 | B1 * | 11/2001 | Doherty | 57/58.65 |
| 7,109,424 | B2 * | 9/2006 | Nordin et al. | 174/113 R |
| 7,728,228 | B2 * | 6/2010 | Nordin et al. | 174/113 R |
| 2005/0151746 | A1 * | 7/2005 | Ford et al. | 345/501 |

* cited by examiner

*Primary Examiner* — Chau Nguyen
(74) *Attorney, Agent, or Firm* — Robert A. McCann; Christopher S. Clancy; Christopher K. Marlow

(57) ABSTRACT

Systems and methods for decreasing alien crosstalk use enhanced patch cords for introducing additional attenuation. The enhanced patch cords are preferably shielded to reduce alien crosstalk down their lengths and also attenuate signals passing therethrough to a greater extent than standard communication patch cords. The interaction of two enhanced patch cords results in two suppression steps for alien crosstalk and only one suppression step for intended signal passing through a communication cable.

14 Claims, 6 Drawing Sheets

ALIEN CROSSTALK SUPPRESSION WITH ENHANCED PATCH CORD

CROSS-REFERENCE TO RELATED APPLICATIONS

This application is a continuation of U.S. patent application Ser. No. 11/468,848, filed Aug. 31, 2006, which is a continuation of U.S. patent application Ser. No. 10/887,718 filed Jul. 9, 2004, which issued as U.S. Pat. No. 7,109,424 on Sep. 19, 2006, which claims the benefit of U.S. Provisional Patent Application Ser. No. 60/486,683, entitled "Alien Crosstalk Suppression with Enhanced Patch Cord Design," filed on Jul. 11, 2003; U.S. Provisional Patent Application Ser. No. 60/488,566, entitled "Alien Crosstalk Suppression With Enhanced Patch Cord," filed on Jul. 18, 2003; and U.S. Provisional Patent Application Ser. No. 60/565,464, entitled "Alien Crosstalk Suppression with Enhanced Patch Cord," filed on Apr. 26, 2004. These provisional applications are further incorporated herein in their entireties.

FIELD OF THE INVENTION

The present invention relates generally to communications systems and more specifically relates to systems and methods for suppressing alien crosstalk in communications.

BACKGROUND OF THE INVENTION

Suppression of crosstalk in communication systems is an increasingly important practice for improving systems' reliability and the quality of communication. As the bandwidth of a communication systems increases, so does the importance of reducing or eliminating signal crosstalk.

In wired communication systems, crosstalk is caused by electromagnetic interference within a communication cable or between multiple cables. Crosstalk resulting from interaction between cables is known as alien crosstalk.

While crosstalk resulting from signals running within a single cable interfering with signals within the same cable can be managed using electronic crosstalk reduction methods, alien crosstalk poses additional problems because the qualities of the interfering or disturbing signal(s) are not known. Alien crosstalk has proven problematic in implementations such as 10 Gbps Ethernet communication over an installed base of Cat 6 or Cat 5e cable. In such cables, alien crosstalk can significantly hamper communication performance. Specially-designed cabling could be used to decrease alien crosstalk, but replacing existing cabling with newly-designed cabling entails significant expense.

Thus, there exists a need for alien crosstalk suppression methods and systems that may be used with installed cable.

SUMMARY OF THE INVENTION

According to one embodiment of the present invention, an improved patch cord having increased attenuation improves performance of an installed cabling system.

According to another embodiment of the present invention, alien crosstalk between communication cables is decreased by a method of using attenuating patch cables connected to the communication cables.

According to another embodiment of the present invention, cabling systems employ an improved patch cord to decrease alien crosstalk between communication cables.

DETAILED DESCRIPTION OF THE ILLUSTRATED EMBODIMENTS

Figure 1:
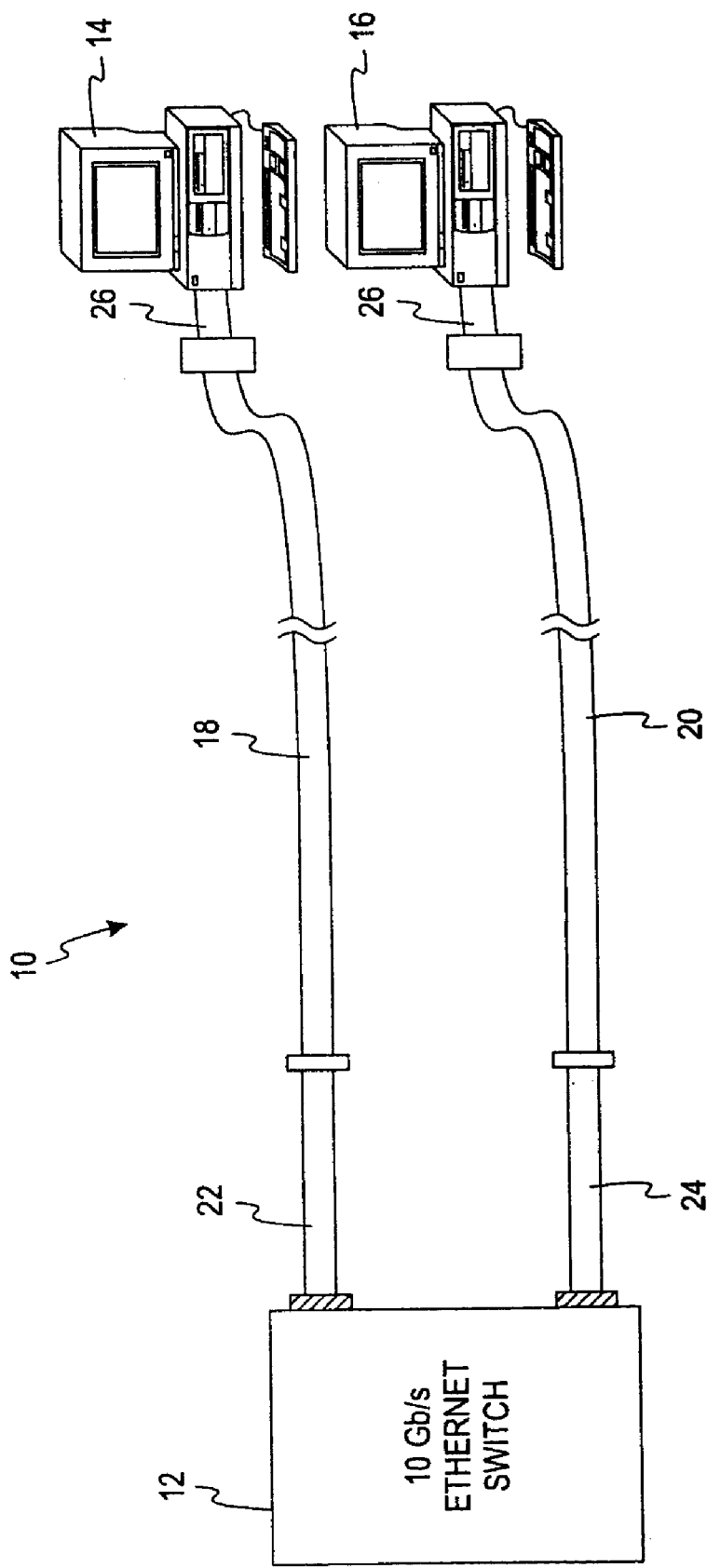
FIG. 1 is a plan view of a communication system according to one embodiment of the present invention.

Turning now to FIG. 1, a communication system 10 is shown. In the communication system 10, a network device such as the 10 Gb/s Ethernet switch 12 is connected to a plurality of devices, such as personal computers ("PCs") 14 and 16 by first and second communication cables 18 and 20, respectively. It is to be understood that while FIG. 1 shows the communication cables 18 and 20 extending from a single network device to two devices, systems and methods according to the present invention will allow for the suppression of alien crosstalk between communication cables regardless of the types of devices to which the cables are connected.

Generally, alien crosstalk resulting from the interaction between the communication cables 18 and 20 will be coupled along the entire lengths of the cables 18 and 20. The cables 18 and 20 act to suppress signal travelling through them to some degree, such that alien crosstalk occurring between the cables closer to the Ethernet switch 12 will be attenuated somewhat at the PCs 14 and 16.

Crosstalk suppression is enhanced in the system of FIG. 1 by the use of first and second enhanced patch cords 22 and 24. The enhanced patch cords 22 and 24 are designed to suppress crosstalk along their lengths, for example by providing additional shielding. In addition, the enhanced patch cords 22 and 24 attenuate communications signals and noise, such as crosstalk, travelling through them. Attenuation in the patch cords 22 and 24 may be accomplished in a number of ways. For example, attenuation may be increased by the use of finer-gauge wire within the enhanced patch cords 22 and 24 or by increasing the number of twists per inch in wires contained within the patch cords 22 and 24.

The strength of alien crosstalk is dependent upon the strength of the interfering or disturbing signal. Thus, increased attenuation provided by the first enhanced patch cord 22 will reduce the signal level in the first communication cable 18. As a result, the alien crosstalk coupled into the second communication cable 20 from the first communication cable will be reduced due to attenuation by the first enhanced patch cord 22. Because the alien crosstalk caused by the first communication cable 18 in the second communication cable 20 will travel in both directions in the second communication cable 20, the alien crosstalk will also be subjected to suppression in the second enhanced patch cord 24.

For example, if a signal leaves the Ethernet switch 12 having a signal strength of 1 volt peak-to-peak, and the first enhanced patch cord 22 attenuates to 10% of the initial strength, the signal going from the Ethernet switch 12 to the first PC 14 will have a signal strength of 0.1 volt peak-to-peak. If 10% of that signal couples as alien crosstalk to the second communication cable 20, the alien crosstalk in the second cable will have a signal strength of 0.01 volt peak-to-peak. If the second enhanced patch cord 24 also has attenuating properties that reduce signals to 10% of the initial strength, the alien crosstalk will be suppressed in the second communication cable 20 to 0.001 volt peak-to-peak. Thus, the alien crosstalk has been subjected to the effects of two enhanced patch cords 22 and 24, and the signal from the Ethernet switch 12 through the second communication cable 20 has been subjected only to the effects of the second enhanced patch cord 24. Optional enhanced patch cords 26 have been shown for connection to the PCs 14 and 16 and similarly operate to reduce alien crosstalk at the user side of the communication connection.

Figure 2:
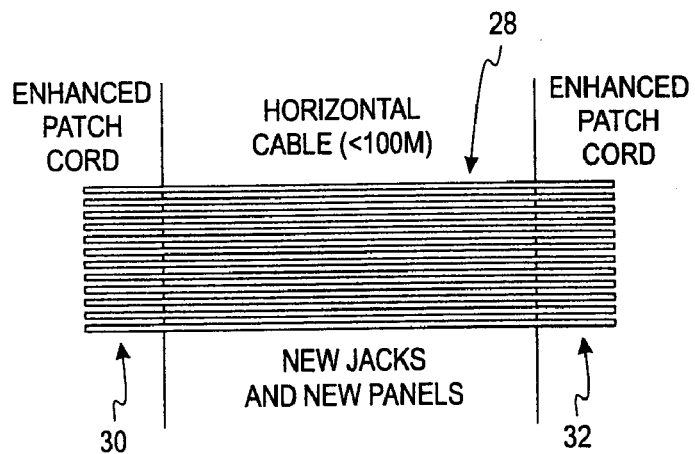
FIG. 2 is a schematic view of a cabling installation with improved patch cords for providing alien crosstalk suppression.

Enhanced patch cords according to the present invention may be integrated into a number of connections, as shown by FIG. 2, in which a horizontal cable plant 28 having multiple cables is enhanced by enhanced patch cords 30 and 32 provided at first and second ends of the communication path.

Figure 3:
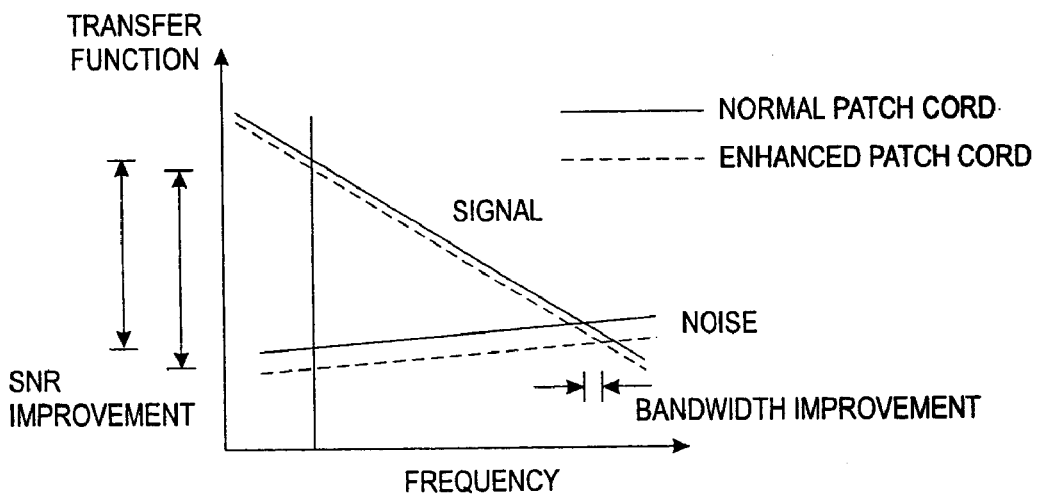
FIG. 3 is a graph showing the increased signal-to-noise ratio in a communication system using an enhanced patch cord according to the present invention.

The enhancement of signal-to-noise ratio using enhanced patch cords according to the present invention is shown in FIG. 3. The dotted line shows the reduced signal and noise resulting from the enhanced patch cords across the communication frequencies. Because the noise due to alien crosstalk is attenuated to a greater degree than the signal, both the available bandwidth and the signal-to-noise ratio are improved in systems employing enhanced patch cords according to the present invention.

Attenuation may be introduced into patch cords and other communication cabling using a variety of methods. There are two design parameters to consider in the design of a lossy patch cord. One parameter is the amount of insertion loss to include in the cable, and the second is the amount of alien crosstalk suppression or susceptibility to have in the cable. Both parameters are preferably addressed in a cable design.

Figure 4:
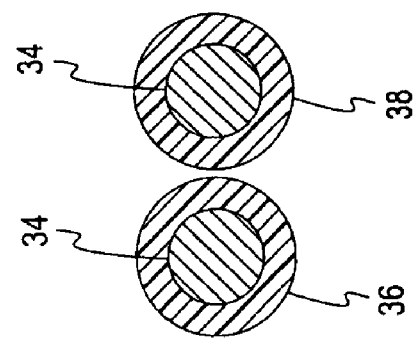
FIG. 4 is a cross-sectional view showing a conductor and lossy conductor insulation according to one embodiment of the present invention.

Dielectric loss may be increased as shown in FIG. 4 by providing a conductor 34 within lossy conductor insulation 36 or 38. Dielectric loss can also be increased by using such methods as: (a) cable jacket dielectric lossy material; (b) cable spline dielectric lossy material; and (c) a wire pair shield (which concentrates the E&M field through the wire insulation).

The use of a less conductive wire (for example, aluminum wire instead of copper wire) will also increase conductor loss. As mentioned above, conductor loss can also be increased by decreasing the conductor wire diameter or increasing the twist per unit length. Increasing the amount of twisting increases the effective length of the cord and hence increases the conductor loss.

Conductor loss can also be increased by "tinning" a metal wire. A less-conductive coating on the circumference of the wire will increase the conductor loss because the current density congregates near the surface (via the skin effect) and will experience a higher loss through the tinned material. The use of stranded wire can also increase conductor loss, with an increase of loss by roughly 20% for comparable wire gauges.

Figure 6:
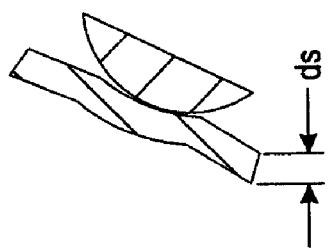
FIG. 6 is a detail view of the detail "A" of FIG. 5.
Figure 5:
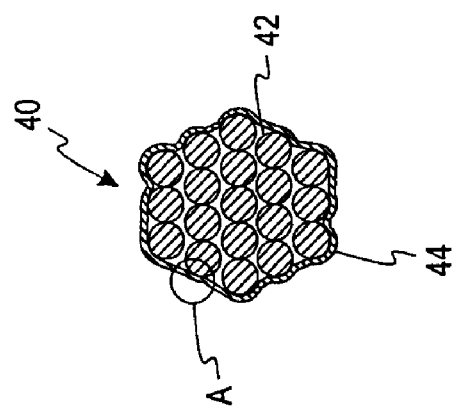
FIG. 5 is a cross-sectional view of stranded wires having a lossy conductive coating.

FIG. 5 shows a cross-sectional view of a cable 40 employing tinning and stranded wire. In the embodiment of FIG. 5, stranded copper conductors 42 are provided within a tin skin 44. FIG. 6 is a detail view of the detail "A" of FIG. 5. The skin is provided at a depth $d_s$.

The use of wire with a roughened surface can also increase the conductor loss through the wire.

Figure 7B:
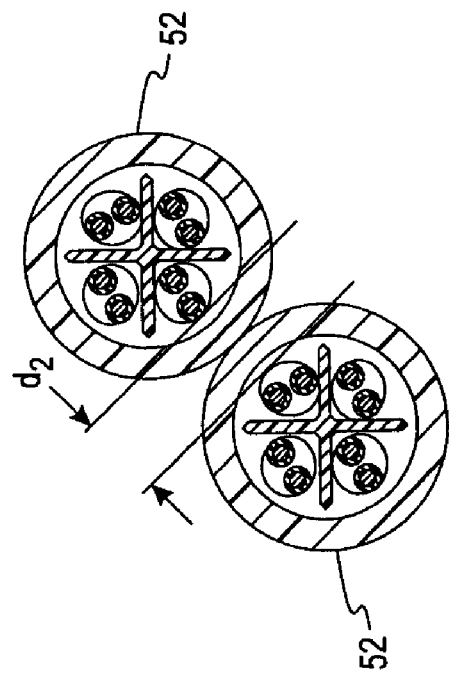
FIGS. 7a and 7b are cross-sectional views showing the comparison of two cable pairs, with the cable pair of FIG. 7b having increased distance between crosstalk pairs.
Figure 7A:
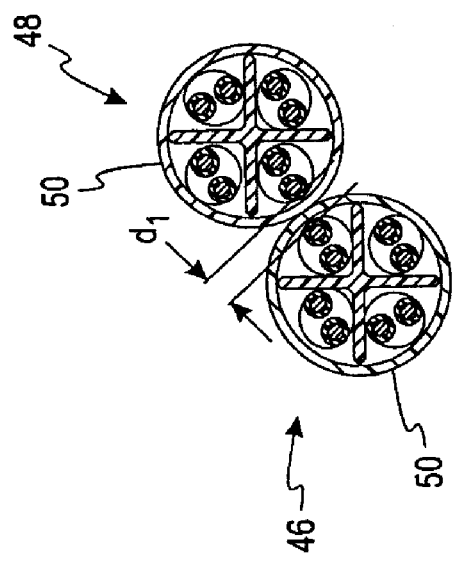

FIGS. 7a and 7b illustrate a technique to decrease the susceptibility of a cable by increasing the physical distance between crosstalk pairs. First and second cables 46 and 48 are placed in an abutting relationship. When the cable jacket material 50 is increased in thickness—for example, to jacket 52, as shown in FIG. 7b—the distance between crosstalk pairs is increased from $d_1$ shown in FIG. 7a to $d_2$ shown in FIG. 7b. According to one embodiment, the cable jacket material 50 is a foamed jacket material. Cable separators may also be used to increase separation between neighboring cables.

Figure 9:
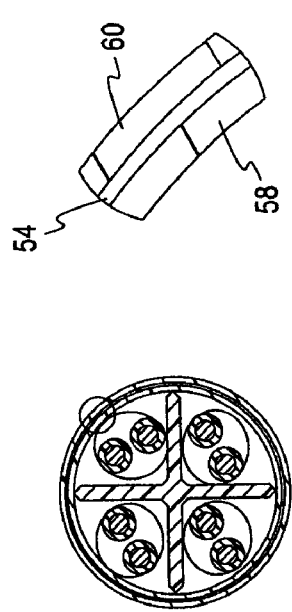
FIG. 9 is a cross-sectional view of a cable having a modified surrounding shield.
Figure 8:
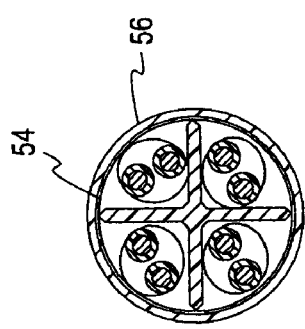
FIG. 8 is a cross-sectional view of a cable having a surrounding shield.

Metallic shielding can also be used to reduce susceptibility of alien signals into a signal cable pair. FIG. 8 is a cross-sectional view showing a technique to decrease the susceptibility of a cable by the incorporation of a conductive shield. In FIG. 8, conductive pairs 52 are provided within an overall conductive shield 54. The conductive shield 54, in turn, is provided within a jacket 56. As shown in FIG. 9 (which incorporates a detail view), in another embodiment a layer of overall shielding 54 may be provided between first and second layers 58 and 60 of jacketing material.

Figure 10:
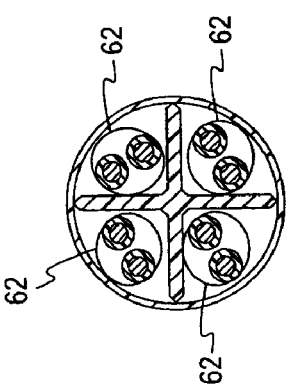
FIG. 10 is a cross-sectional view of a cable having shielding surrounding each wire pair.

FIG. 10 shows another embodiment, in which individual shielding 62 surrounds each wire pair.

Figure 11:
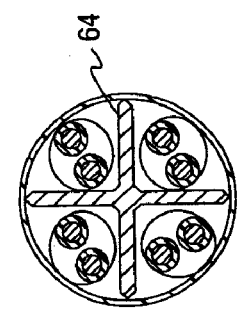
FIG. 11 is a cross-sectional view of a cable having a conductive spline.

Another embodiment is shown in FIG. 11, which illustrates the use of a conductive spline 64 or conductive pair separator used to decrease susceptibility.

In another embodiment, crosstalk may be reduced by modifying the lay of a cable along its length. The lay of a cable refers to the twisting of a cable along its length. In this embodiment, fixed twisted pair lengths are provided along the length of a cable. Four or more cable lay values providing a four-pair cable with twisted pair lengths over the length of the cable meeting the proposed 10 Gb/s Ethernet Near-End Crosstalk (NEXT) requirement are selected. Any four or more cable lay values are chosen at random, with the selection process being described as follows:

1. Cable lays (A, B, C, D, . . . ) are selected, with each of the lays meeting the 10 Gb/s Ethernet NEXT requirement.
2. Any of the four cable lays are selected without replacement during the cable lay process.
3. The selected cable lay is provided over a uniform or random length of cable less than or equal to ten meters.
4. Any of the three or more remaining cable lays are selected and applied to the cable construction as described in step 3.
5. The process is repeated until all cable lays have been assigned.

Figure 12:
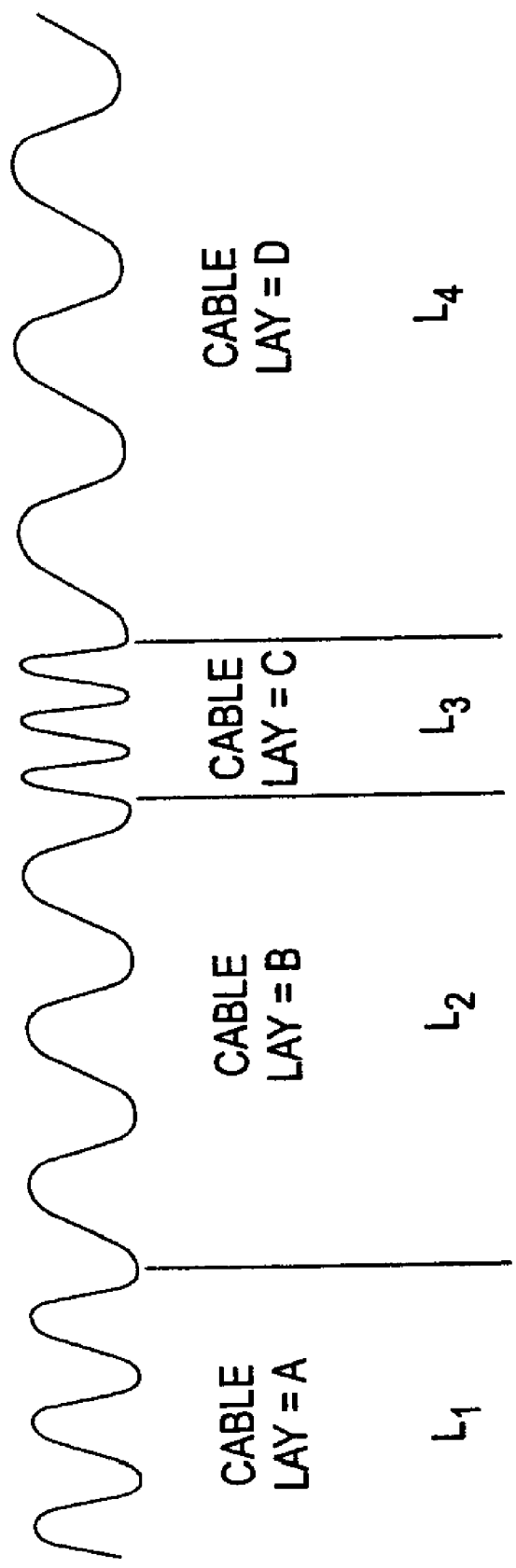
FIG. 12 is a diagram illustrating varying cable lays along the length of a cable.

A diagram of a cable length employing random distances between cable lay transitions and using four different cable lays is shown in FIG. 12.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of manufacturing a communication cable comprising:
   a) choosing a finite number of discrete cable lay values;
   b) randomly selecting a first one of said plurality of cable lay values;
   c) constructing a first length of said communication cable by applying the first selected cable lay value to said first length of cable;
   d) randomly selecting a second one of said plurality of cable lay values;
   e) constructing a second length of said communication cable by applying the second selected cable lay value to said second length of cable; and
   f) continuing to randomly select said cable lay values and apply said cable lay values to lengths of said communication cable until said plurality of cable lay values are exhausted.

2. The method of claim 1 wherein said plurality of cable lay values comprises four cable lay values.

3. The method of claim 1 wherein said second length of said communication cable has the same length as said first length of said communication cable.

4. The method of claim 1 wherein said second length of said communication cable has a different length than said first length of said communication cable, the lengths of the first and second lengths of said communication cable differing by a randomly chosen amount.

5. The method of claim 1 wherein choosing said plurality of cable lay values comprises choosing the cable lay values at random.

6. The method of claim 5 wherein each of said plurality of cable lay values meets the near-end crosstalk (NEXT) requirements for 10 Gb/s Ethernet communications.

7. A communication cable comprising:
   a first length of cable having a first cable lay value; and
   a second length of cable having a second cable lay value;
   wherein said first and second cable lay values are different from one another and randomly chosen from a finite list of discrete cable lay values.

8. The communication cable of claim 7 wherein said first and second cable lay values meet the near-end crosstalk (NEXT) requirements for 10 Gb/s Ethernet communications.

9. The communication cable of claim 7 wherein said first and second lengths of cable have the same length.

10. The communication cable of claim 7 wherein the second length of cable has a length that differs from the length of the first length of cable by a randomly chosen amount.

11. A communication cable comprising:
    a first length of cable having a first cable lay value;
    a second length of cable having a second cable lay value;
    a third length of cable having a third cable lay value; and
    a fourth length of cable having a fourth cable lay value;
    wherein said first, second, third, and fourth cable lay values are different from one another and randomly chosen from a finite list of discrete cable lay values.

12. The communication cable of claim 11 wherein said first, second, third, and fourth cable lay values meet the near-end crosstalk (NEXT) requirements for 10 Gb/s Ethernet communications.

13. The communication cable of claim 11 wherein said first, second, third, and fourth lengths of cable have the same length.

14. The communication cable of claim 11 wherein said first, second, third, and fourth lengths of cable have lengths that differ from one another by random amounts.

* * * * *